United States Patent Office 3,502,699
Patented Mar. 24, 1970

3,502,699
NOVEL Δ⁴,⁹-3-KETOSTEROIDS AND METHOD FOR PREPARING SAME
Gordon Alan Hughes, King of Prussia, Pa.; Herchel Smith, 500 Chestnut Lane, Wayne, Pa. 19087; and David Hartley, King of Prussia, Pa.; said Hughes and said Hartley assignors to said Smith
No Drawing. Filed May 15, 1962, Ser. No. 194,972
Int. Cl. C07c *167/02, 169/20*
U.S. Cl. 260—397.45                5 Claims

ABSTRACT OF THE DISCLOSURE

Processes for preparing gona-4,9-dien-3-ones having anti-estrogenic, anabolic and progestational activity and for preparing intermediates therefor are described.

---

This invention concerns certain novel steroidal ketones useful as anti-estrogenic-treating, anabolic and progestational agents which may be represented by the general structure:

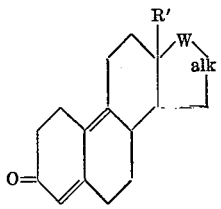

wherein R' represents a lower alkyl group, W represents a member selected from the group consisting of carbonyl, hydroxymethylene, acyloxymethylene, alkylhydroxymethylene, α-alkylenedioxymethylene, β-alkylenedioxymethylene, alkynylhydroxymethylene and alkenylhdroxymethylene, and ALK represents a member selected from the group consisting of methylene and ethylene with the express provision that when R' represents methyl, ALK must represent ethylene.

The novel compounds of our invention may be prepared in one manner by bromination followed by dehydrobromination of the 13-alkylgon-5(10)-en-3-ones and the 13-alkyl-D-homogon-5(10)-en-3-ones disclosed in the copending application of Gordon Alan Hughes and Herchel Smith, Ser. No. 195,000 filed May 15, 1962 and now abandoned. This bromination-dehydrobromination sequence is conducted preferably in the same reaction mixture in pyridine or an alkylated pyridine as solvent, by contacting a solution of the 13-alkylgon-5(10)-en-3-one and the 13-alkyl-D-homogon-5(10)-en-3-one used as starting materials with one molecular equivalent of pyridine hydrobromide perbromide at room temperature for a period of from 10 to 30 minutes followed by treatment at a higher temperature so as to effect dehydrobromination to the desired gona-4,9-dien-3-one system.

The use of pyridine or an alkylated pyridine in this manner of preparation is important in view of the fact that the intermediate 5,10-dibromo or 10-bromo-Δ⁴-3-ketosteroids formed in other solutions such as acetic acid or halohydrocarbon solutions tend to decompose yielding phenolic products. Specifically, treatment of 18-homo-17β-hydroxyestr-5(10)-en-3-one (I) disclosed in our aforesaid application Ser. No. 195,000 with an equivalent quantity of a bromide such as pyridine hydrobromide perbromide gives the compound 18-homo-17β-hydroxyestra-4,9-dien-3-one (II).

Oxidation with a reagent such as chromic acid of this compound (II) gives the corresponding 3,17-dione (III) if desired. In a similar fashion bromination of 17α-alkynyl-18-homo-17β-hydroxyestr-5(10)-en-3one (IV) gives the corresponding 17α-alkynyl-18-homo-17β-hydroxyestra-4,9-dien-3-one (V). Also, a parallel series of reactions may be performed starting from 18-homo-17β-hydroxy-17α-vinylestr-5(10)-en-3-one (VI) which on bromination with two molecular equivalents of pyridine hydrobromide perbromide followed by dehydrobromination under the aforesaid conditions yields dibromo-intermediate (VII) which is converted to 18-homo-17β-hydroxy-17α-vinylestra-4,9-dien-3-one (VIII) by debromination with a suitable debrominating agent such as sodium iodide in acetone.

The gonane nomenclature for steroids is described in the definitive rules for the nomenclature of steroids recommended by the I.U.P.A.C. See J.A.C.S., 1960, 82, 5577. An unsubstituted gonane nucleus would have the structure:

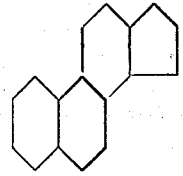

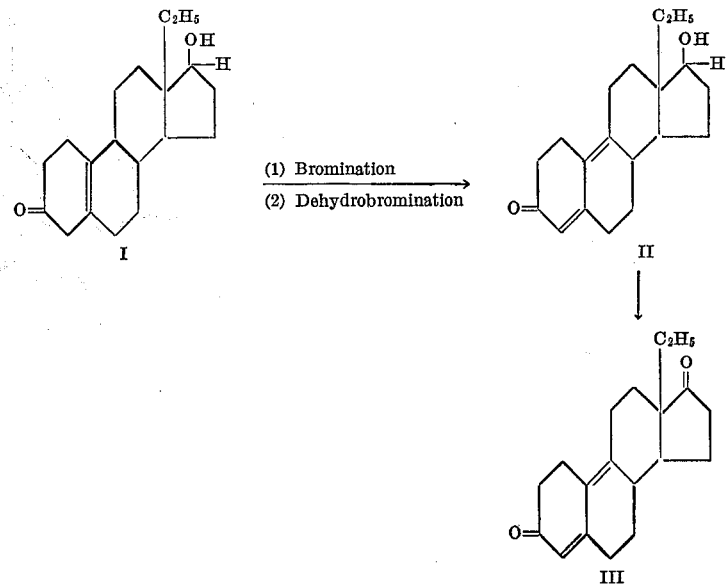

(1) Bromination
(2) Dehydrobromination

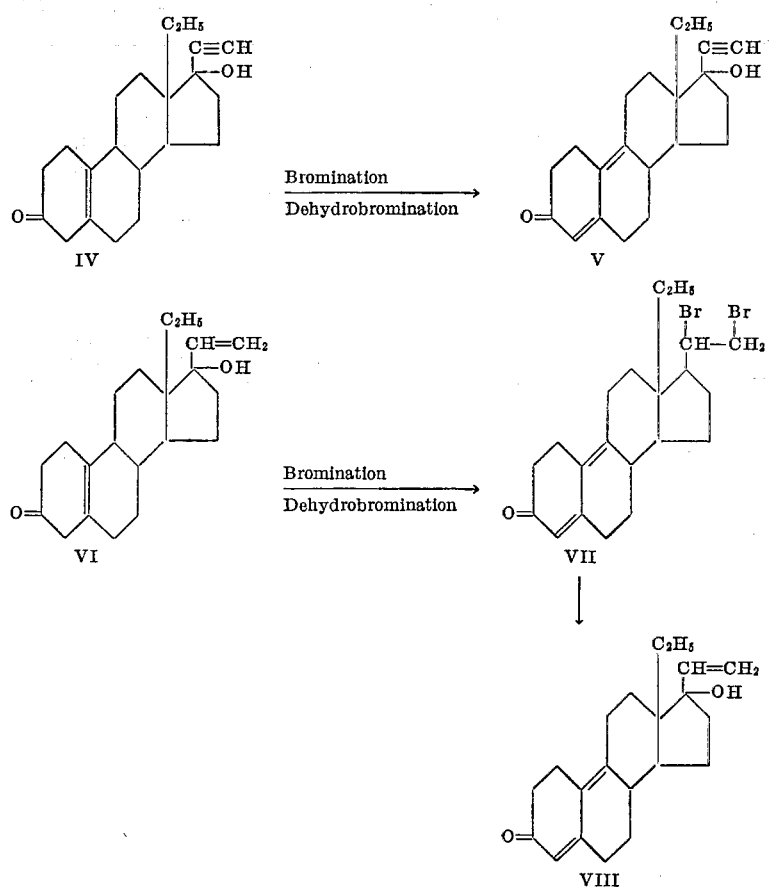

It should be understood that the above reactions are intended merely to illustrate further some of the many possible products which may be formed by bromination in pyridine of the novel homologated steroids involved as starting materials in our invention. A host of other such derivatives may be obtained as one versed in the art will recognize. In any case we believe our synthesis of $\Delta^{4,9}$-homologated steroids of the estrane series to be the first instance of such a useful synthetic reaction. By the term "homologated" as employed herein it is intended to refer to those compounds wherein the 13-position is filled with a lower alkyl group in the case of the series where the D ring is a 6-membered homocycle and an alkyl substituent of from two to four carbon atoms where the D ring is a 5-membered homocycle.

In still another method of preparation of the compounds of our invention we have discovered a new and useful synthesis for the preparation of $\Delta^{4,9}$-homologated estranes of the type generally disclosed above. The following schematic outline illustrates this method:

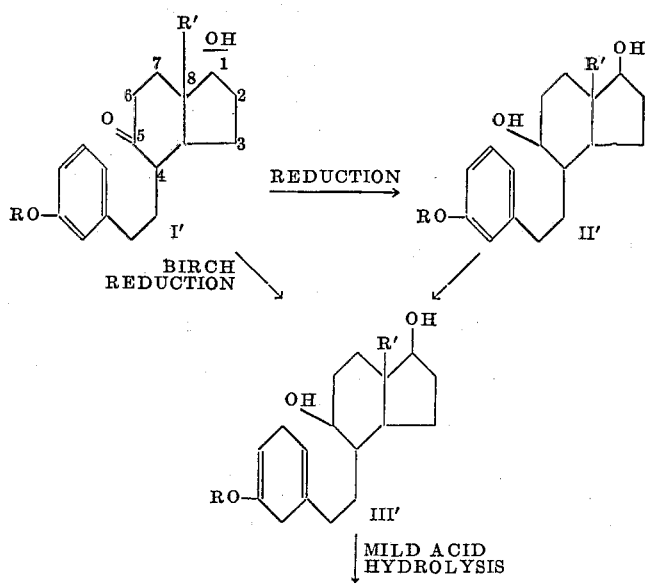

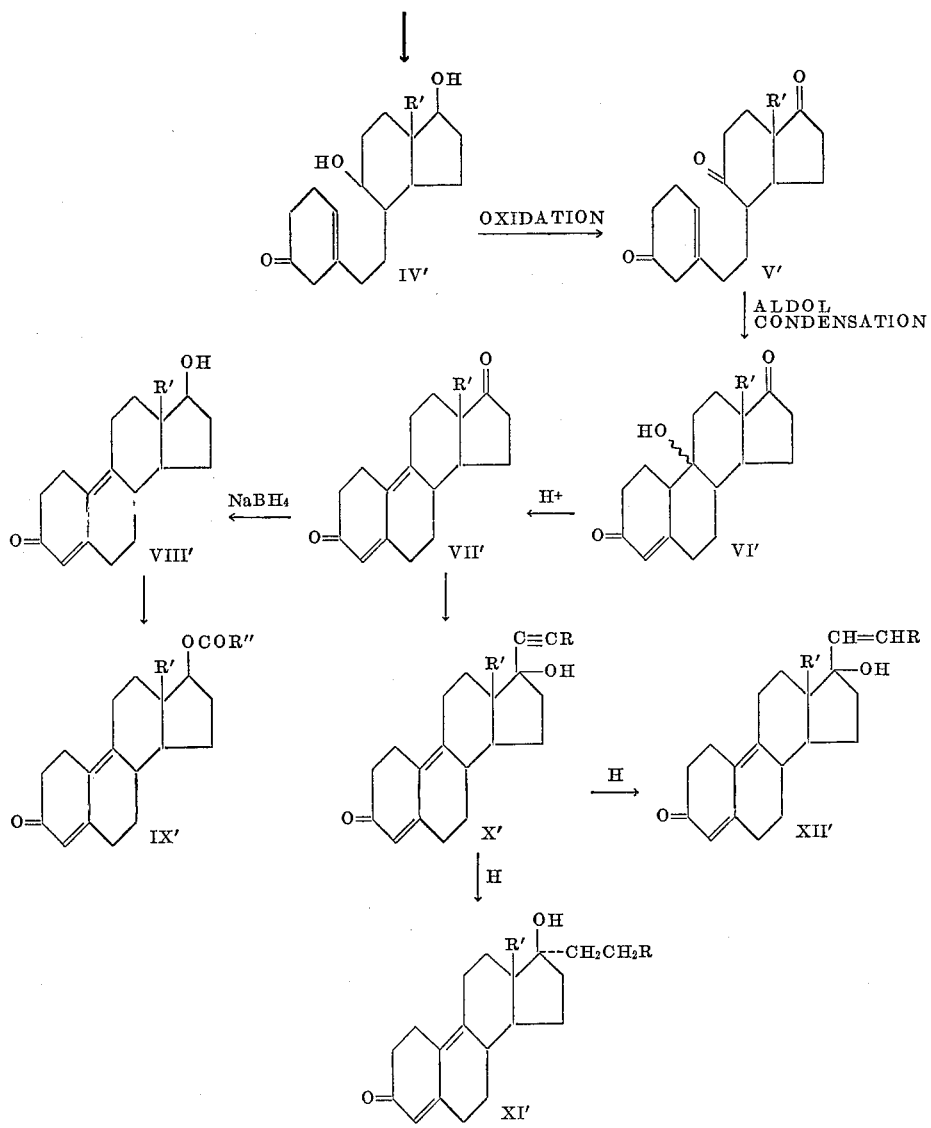

In the above process when hydrogenating from the 17-alkynylhydroxy substituted (X') to the 17-alkenylhydroxy substituted analog (XII') it may be necessary under certain conditions to protect the 3-keto grouping prior to hydrogenation by formation of a corresponding 3-ketal by conventional techniques. This group may be later removed by acid hydrolysis. The symbols R and R' represent a lower alkyl group in each instance where disclosed in our schematic diagram of the reaction.

The general method illustrated above proceeds by an initial reduction of a compound such as 1-hydroxy-4-(2'-m-alkoxyphenylethyl) - 8 - alkyl-trans-hexahydroindan-5-one (I') (or its corresponding Decalin analog if desired to have the D-ring in the final steroid a D-homo or 6 membered ring). In the former case as illustrated herein reduction with such well known reducing agents as sodium borohydride, lithium aluminum hydride, lithium in liquid ammonia, sodium in ethanol and the like yields the corresponding 1,5 diol (II'). If desired the process may be shortened by doing a Birch type reduction of (I') to obtain the diene alcohol (III') directly. By mild acid hydrolysis of the diene alcohol (III') by such reagents as for example aqueous oxalic acid in ethanol or the like we obtain the corresponding unsaturated ketone (IV') which upon oxidation with such agents as chromic acid in acetone at room temperature yields the corresponding unsaturated triketone (V'). By means of an aldol condensation on (V') there is obtained the 13-alkyl-9-hydroxygon-4-en-3,17-dione (VI'), dehydration of which under mild acid conditions or by treatment with a suitable acid chloride in pyridine at low temperature yields the 13-alkyl-gona-4,9-dien-3,17-dione (VII'). From this starting material (VII') various conventional derivatives may be derived by such treatments as (a) reduction of (VII') with alkali metal borohydride such as NaHB$_4$ at low temperature to obtain the 17-hydroxy substituted analog (VIII'), which may be esterified to the 17-esters represented by (IX') by conventional technique; (b) treatment of (VII') with an alkali metal salt of an alk-1-yne in liquid ammonia at low temperature under conditions whereby the 4,9-dien-3-one-system is protected against reaction by formation of its alkali metal enolate salt, yields the 17-alkynyl dienone (X'). Suitable hydrogenation of the 17-alkynyl dienone will yield the corresponding 17-alkenyl dienone (XII'). Additionally further selective hydrogenation yields the corresponding 17-alkyl dienone (XI'). As a general rule in any of the aforesaid steps leading from compound (VII') the ketal substituent at position 3 may be formed prior to reaction and subsequently removed.

A further exemplification of some of the biological activity of some selected compounds of our series may be seen from the test data developed for these compounds test animals, particularly rats and mice. The results for androgenic activity are expressed in percent as compared with the relative activity of testosterone propionate as 100 percent (*). The results for progestational and antiestrogenic activity is reported as compared with the activity of progesterone as 100 percent. Anabolic activity is also expressed in percent as compared with the relative activity of testosterone propionate as 100 percent.

| Compound | Activity (Percent) | | | |
|---|---|---|---|---|
| | Androgenic* | Progestational | Anabolic* | Anti-estrogenic |
| 17α-ethyl-18-homo-17β-hydroxyestra-4,9-dien-3-one | 24 | 20 | 600 | 1,000 |
| 18-homo-17β-3'-phenylpropionyloxyestra-4,9-dien-3-one | 30 | | 500 | 300 |
| 17α-ethynyl-18-homo-17β-hydroxy-4,9-dien-3-one | 3 | 50 | 50 | 1,000 |

It is of course understood that our novel antiestrogenic treating, anabolic and progestational agents may be administered in a number of conventional forms such as emulsions elixirs, powders, either in syrups, capsules or compressed tablets or by subcutaneous or intramuscular or intravenous injection where feasible. In this respect also it may admixed with pharmaceutically acceptable carriers diluents, extenders and the like where desired for ease of administration.

The terms "homo" and "homologated" as they are employed in the specification and claims refer to that alkyl substitution at position 18 in an estrane nucleus which involves a hydrocarbon group specifically an alkyl containing about 1 to 20 carbon atoms therein. Not to be confused with the aforesaid terms, the other term "D-Homo" as employed herein refers to a D ring which has 6 rather than 5 carbon atoms therein, i.e., cyclohexano rather than cyclopentano, when it comprises a moiety of a cyclic nucleus for the compounds of our invention.

It must be understood further that this nomenclature is not to be construed as an admission of any chemical or functional relationship existing between the unique compounds of our invention and naturally occurring steroids since prior to our concept of total synthesis of these unique structures from simple chemicals it was unknown to the chemist to have any alkyl substitution other than methyl (found in natural product) present at position 13 in ring A aromatic and hydroaromatic steroids. Consequently, without a means of prior total synthesis the formation of such higher alkylated members was not chemically feasible to the skilled steroid chemist since mere alkylation of the natural product at position 18 is not known to be possible.

In the appended examples light absorption refers to the wavelength in mμ of the position of maximum light absorption and figures in parenthesis refer to the molecular extinction coefficient at this wavelength; infrared absorption refers to the frequencies in wave-numbers of maxima in the infrared absorption spectrum.

EXAMPLE 1

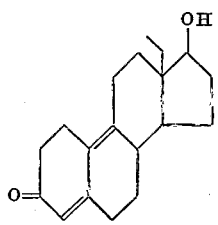

18-homo-17β-hydroxyestra-4,9-dien-3-one

Add 18-homo-17β-hydroxyestr-5(10)-en-3-one (2.16 g.) in pyridine (7.5 cc.) to a solution of pyridine hydrobromide perbromide (2.4 g.) in pyridine (22.5 cc.). Stir the mixture under nitrogen for 30 minutes at room temperature and then heat at 100° for a further 30 minutes. On cooling add the mixture to 2 N hydrochloric acid (300 cc.) and crushed ice (100 g.) and collect the product in ether-benzene. Remove the solvent obtain a residue which is recrystallised from ether to give 18-homo-17β-hydroxyestra-4,9-dien-3-one (1.55 g.) M.P. 147–148°. The analytical specimen, obtained by two further recrystallisations from ethylacetatebenzene has M.P. 152–154.5°; light absorption 303 (19,200); infrared absorption 3400, 1640, 1612, 1578 (Found: C, 79.8; H, 9.3. $C_{19}H_{26}O_2$ requires, C, 79.7; H, 9.15%).

EXAMPLE 2

18-homo-17β-3'-phenylpropionyloxyestra-4,9-dien-3-one

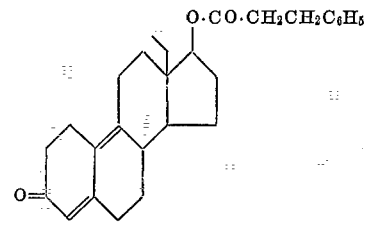

Add 3-phenylpropionyl chloride (12 cc.) in benzene (50 cc.) to (±)-18-homo-17β-hydroxyestr-5(10)-en-3 one (11 g.) in pyridine (50 cc.) at −18°. Leave the mixture overnight at −10° and add to crushed ice and acidify with 20% hydrochloric acid. Collect the product with benzene-ether and evaporate the solvent to give a residue which is recrystallised from benzene-ether to give 18-homo-17β-3'-phenylpropionyloxyestra-4,9-dien-3-one (9 g.) M.P. 127–129°; light absorption 305 (21,600); infrared absorption ($CHCl_3$) 1725, 1650, 1605 (Found: C, 80.65; H, 8.2. $C_{28}H_{34}O_3$ requires C, 80.3; H, 8.2%).

EXAMPLE 3

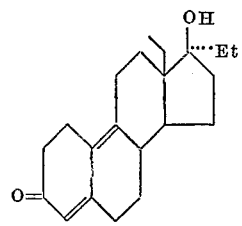

17α-ethyl-18-homo-17β-hydroxyestra-4,9-dien-3-one

Add (±)-17α-ethyl-18-homo-17β-hydroxyestr-5(10)-en-3-one (15.8 g.) in pyridine (75 cc.) to a solution of pyridine hydrobromide perbromide (17 g.) in pyridine (75 cc.). Carry out the reaction and work up the product as in Example 1 to give (from ether-hexane) 17α-ethyl-18-homo-17β-hydroxyestra-4,9-dien-3-one (11.1 g.) M.P. 119–121°. The analytical sample, obtained by recrystallisation from ethyl acetate, has M.P. 121–122°; light absorption 307 (21,200); infrared absorption 3410, 1650, 1600, 1572 (Found: C, 80.3; H, 9.4. $C_{21}H_{30}O_2$ requires C, 80.2; H, 9.6%).

EXAMPLE 4

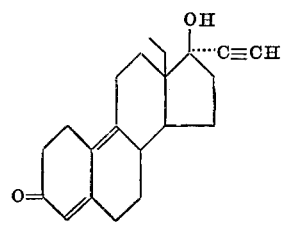

17α-ethynyl-18-homo-17β-hydroxyestra-4,9-dien-3-one

Add (±)-17α-ethnyl-18-homo-17β-hydroxyestr-5(10)-en-3-one (0.68 g.) in pyridine (5 cc.) to a solution of pyridine hydrobromide perbromide (0.7 g.) in pyridine (7.5 cc.). Carry out the reaction and work up the product as in Example 1 to give (from ether) 17α-ethynyl-18-homo-17β-hydroxyestra-4,9-dien-3-one (0.5 g.) M.P. 180–185. Take up this material in ether-benzene (1:1) and percolate the solution through activated Fuller's earth (Florex XXS). The product obtained by recrystallisation from chloroform-hexane has M.P. 182.5–185.5; light absorption 306 (20,000); infrared absorption 3230, 3220, 2080, 1634, 16 (Found: C, 81.; H, 8.3. $C_{21}H_{26}O_2$ requires C, 81.25; H, 8.4%).

EXAMPLE 5

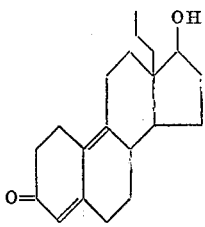

17β-hydroxy-18-nor-13-n-propylestra-4,9-dien-3-one

All 17β-hydroxy-18-nor-13-n-propylestr-5(10)-en-3-one (6.0 g.) in pyridine (25 cc.) to pyridine hydrobromide perbromide (6.7 g.) in pyridine (50 cc.). Carry out the reaction and work up the product as in Example 1 to give (from ethyl acetate-hexane) 17β-hydroxy-18-nor-13-n-propylestra-4,9-dien-3-one (4.1 g.) M.P. 173–179°. The analytical specimen, obtained by recrystallisation from chloroform-ether has M.P. 179–182°; light absorption 307 (20,800); infrared absorption 3330, 1640, 1605, 1580 (Found: C, 79.5; H, 9.1. $C_{20}H_{28}O_2$ requires C, 79.95; H, 9.4%).

EXAMPLE 6

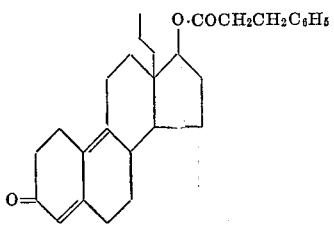

18-nor-17β-3'-phenylpropionyloxy-13-n-propylestra-4,9-dien-3-one

Add 3-phenylpropionyl chloride (1 cc.) in benzene (7.5 cc.) to 17β-hydroxy-18-nor-13-n-propylestra-4,9-dien-3-one (0.8 g.) in pyridine (7.5 cc.) at −18°. Leave the mixture overnight at −10°. and work up as previously described in Example 2 to give a residue which is taken up in benzene and chromatographed on silica gel. Elute with benzene-ether (9:1) to give material which is recrystallised from ether-hexane to give 18-nor-17β-3'-phenylpropionyloxy-13-n-propylestra-4,9-dien-3-one (0.13 g.) M.P. 75–78°. The analytical specimen obtained by recrystallisation from ether-hexane has M.P. 76–78°; light absorption 306 (21,400); infrared absorption 1730, 1660, 1590 (Found: C, 80.4; H, 8.3. $C_{29}H_{36}O_3$ requires C, 80.5; H, 8.4%).

EXAMPLE 7

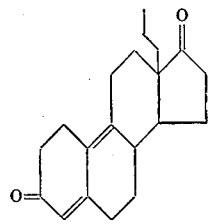

18-nor-13-n-propylestra-4,9-dien-3,17-dione

Add chromic acid (1 cc.) (prepared by dissolving 26 g. of chromium trioxide in 23 cc. of concentrated sulphuric acid and diluting with water to 100 cc.) dropwise to 17β-hydroxy-18-nor-13-n-propylestra-4,9-dien-3-one (0.8 g.) in acetone (50 cc.) containing anhydrous magnesium sulphate (1 g.). After stirring for 3 mins. add isopropyl alcohol (4 cc.) followed by sodium bicarbonate (4 g.) and filter the mixture. Evaporate the filtrate to dryness and recrystallise the residue from ether-hexane to give 18-nor-13-n-propylestra-4,9-dien-3,17-dione (0.54 g.) M.P. 175–178°. The analytical specimen, obtained by recrystallisation from ethyl acetate, has M.P. 180–181°; light absorption 305 (20,700); infrared absorption 1730, 1653, 1605 (Found: C, 80.4; H, 8.55. $C_{20}H_{26}O_2$ requires C, 80.5; H, 8.8%).

EXAMPLE 8

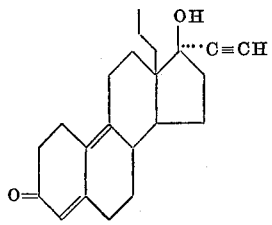

17α-ethynyl-17β-hydroxy-18-nor-13-n-propyl-estra-4,9-dien-3-one

Add 17α-ethyl - 17β-hydroxy -18- nor-13-n-propyl-estr-5(10)-en-3-one (2.6 g.) in pyridine (40 cc.) to pyridine hydrobromide perbromide (2.7 g.) in pyridine (40 cc.). Carry out the reaction and work up the product as in Example 1 to give (from ether-hexane) 17α-ethynyl-17β-hydroxy-18-nor-13-n-propylestra-4,9-dien-3-one (1.6 g.) M.P. 69–75°. The analytical specimen, obtained by recrystallisation from ethyl acetate and then from ether-hexane has M.P. 74–76° (decomp.) light absorption 306 (19,100); infrared absorption 3390, 3210, 1650 (Found: C, 79.8; H, 8.8. $C_{22}H_{28}O_2$ requires C, 81.4; H, 8.7%).

EXAMPLE 9

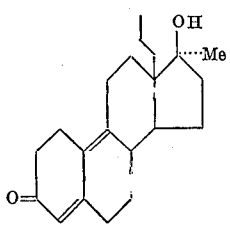

17β-hydroxy-17α-methyl-18-nor-13-n-propylestra-4,9-dien-3-one

Add 17β-hydroxy-17α-methyl-18-nor-13-n-propyl-estr-5(10)-en-3-one (1.6 g.) in pyridine (7.5 cc.) to a solution of pyridine hydrobromide perbromide (1.7 g.) in pyridine (7.5 cc.). Carry out the reaction and work up the product as in Example 1 to give (from ether-hexane) 17β-hydroxy - 17α-methyl - 18 - nor - 13 - n - propyl-estra-4,9-dien-3-one; light absorption 307 (21,200); infrared absorption 3410, 1650, 1600, 1572.

EXAMPLE 10

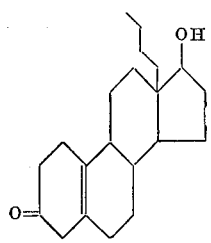

13-n-butyl-17α-hydroxy-18-norestr-5(10)-en-3-one

Add 13 - n - butyl - 1,4 - dihydro - 18 - norestradiol-3-methyl ether (4.6 g.) in dioxan (17.8 cc.) with stirring under nitrogen to methanol (354 cc.) containing oxalic acid dihydrate (5.85 g.) and water (59 cc.). Continue stirring for 45 min. and add the solution to water (885 cc.) and collect the product with ether-benzene (1:1). Wash, dry and evaporate to give a residue which is recrystallised from ether to give 13-n-butyl-17β-hydroxy-18-norestr-5(10)-en-3-one (3.2 g.) M.P. 104–107°; infrared absorption 3450; 1710 (Found: C, 79.8; H, 9.9. $C_{21}H_{32}O_2$ requires C, 79.7; 10.2%).

EXAMPLE 11

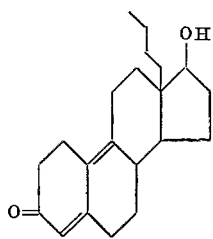

13β-n-butyl-17β-hydroxy-18-norestra-4,9-dien-3-one

Add 13β - n - butyl - 17β - hydroxy - 18 - norestr-5(10)-en-3-one (2.85 g.) in pyridine (10 cc.) under nitrogen to pyridine hydrobromide perbromide (3.03 g.) in pyridine (25 cc.). Carry out the reaction and work up the product as in Example 1 to give (from ether-chloroform) 13β - n - butyl - 17β - hydroxy - 18 - norestra-4,9-dien-3-one (1.5 g.) M.P. 151–152°; light absorption 305–306 (20,400); infrared absorption 3300, 1640, 1603, 1580 (Found: C, 80.0; H, 9.70. $C_{21}H_{30}O_2$ requires C, 80.2; H, 9.6%).

EXAMPLE 12

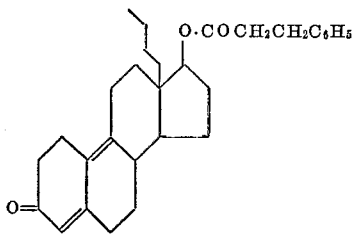

13β-n-butyl-18-nor-17β-3'-phenylpropionyloxyestra-4,9-dien-3-one

Add 3-phenylpropionyl chloride (1 cc.) in benzene (4 cc.) to 13β-n-butyl-17β-hydroxy18-norestra-4,9-dien-3-one (0.9 g.) in pyridine (4 cc.) at —20°. Leave the mixture overnight at —10° and then work up as in Example 2 to give a residue of 13β-n-butyl-18-nor-17β-3' phenylpropionyloxyestra-4,9-dien-3-one (1.2 g.); infrared absorption 1735, 1667, 1639, 1608.

EXAMPLE 13

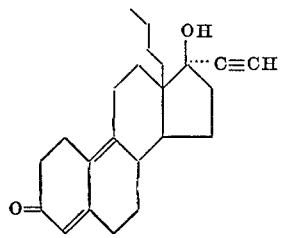

13β-n-butyl-17α-ethnyl-17β-hydroxy-18-nor-estra-4,9-dien-3-one

All 13β-n-butyl - 17α - ethynyl-17β-hydroxy-18-norestr-5(10)-en-3-one (0.6 g.) in pyridine (2.5 cc.) to pyridine hydrobromide perbromide (0.59 g.) in pyridine (6 cc.). Carry out the reaction and work up the product as in Example 1 to give a residue of 13β-n-butyl-17α-ethynyl-17β-hydroxy-18-norestra-4,9-dien-3-one (0.5 g.); infrared absorption 3390, 3280, 1645, 1603.

EXAMPLE 14

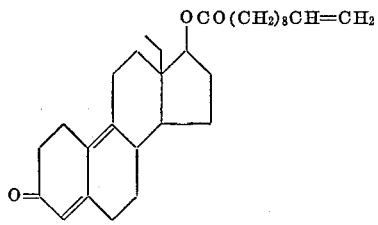

18-homo-17β-undecenyloxyestra-4,9-dien-3-one

Add undecenoyl chloride (2 g.) in benzene (6 cc.) to a solution of 17β-hydroxy-18-homo-estra-4,9-dien-3-one (2 g.) in pyridine (6 cc.) at —15°. Leave the mixture overnight at —10° and then work up as in Example 2 to give 18-homo-17β-undecenyloxyestra-4,9-dien-3-one (2.1 g.); infrered absorption, 1730, 1665, 1635, 1610.

EXAMPLE 15

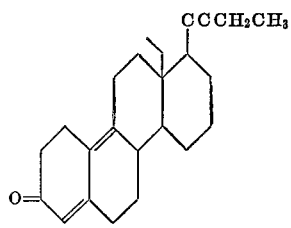

17β-3'-propionyloxy-18,D-bishomoestra-4,9-dien-3-one

Add propionyl chloride (0.5 cc.) in benzene (3 cc.) to a solution of 17β-hydroxy-18,D-bishomoestra-4,9-dien-3-one (0.8 g.) in pyridine (3 cc.) at 0°. Leave the mixture overnight at room temperature and then work up as in Example 2 to give 17β-3'-propionyloxy-18,D-bishomo-estra-4,9-dien-3-one (0.8 g.); infrared absorption 1732, 1665, 1635.

EXAMPLE 16

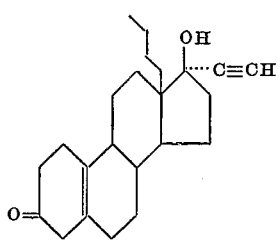

13β-n-butyl-17α-ethylnyl-17β-hydroxy-18-nor-estr-5(10)-en-3-one

Add 13β-n-butyl-1,4-dihydro - 17α-ethynyl-18-norestradiol 3 methyl ether (2 g.) in dioxan (45 cc.) to methanol (50 cc.) containing oxalic acid dihydrate (1 g.) and water (12 cc.). Stir the mixture under nitrogen for 45 minutes, then add to water (500 cc.). Collect the product with benzene and work up as in Example 10 to give a residue which is recrystallised from ethyl acetate-pentane to give 13β - n - butyl - 17α - ethynyl-17β-hydroxy-18-nor-estr-5(10)-en-3-one (0.6 g.) M.P. 160–164° infrared absorption 3480, 3250, 1718.

EXAMPLE 17

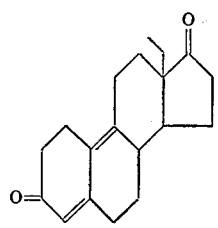

18-homoestra-4,9-dien-3,17-dione

Add pyridine hydrobromide perbromide (1.5 g.) with stirring to 18-homoestr-5(10)-en-3-one (1.5 g.) in pyridine (50 cc.) under nitrogen. Stir the mixture for 10 minutes at room temperature, then for 20 minutes on the steam bath. Work up as in Example 1 to give a product which, when recrystallised from ethyl acetate, gives 18-homoestra-4,9-dien-3,17-dione (.85 g.) M.P. 126–128°; light absorption 303 (20,200); infrared absorption 1733, 1645, 1597, 1575 (Found: C, 80.3; H, 8.4. $C_{19}H_{26}O_2$ requires C, 80.3; H, 8.45%).

EXAMPLE 18

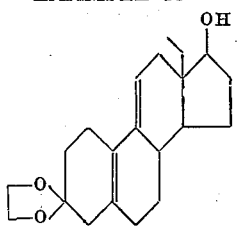

3-ethylenedioxy-17β-hydroxy-18-homoestra-5(10, 9(11)-diene

Reflux a solution of 17β-hydroxy - 18 - homoestra-4,9-dien-3-one (0.5 g.) in benzene (10 cc.) with ethylene glycol (1 cc.) and p-toluene sulphonic acid (0.01 g.) for 5 hours. Cool, add ether (50 cc.) and wash the mixture with water. Evaporate the dried organic phase to give 3-ethylenedioxy - 17β-hydroxy-18-homoestra-5(10),9(11)-diene (0.5 g.); infrared absorption 3400, 1095, 1040.

EXAMPLE 19

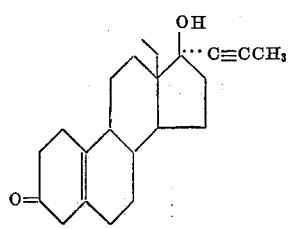

18-homo-17β-hydroxy-17α-propynylestr-5(10)-en-3-one

Add 1,4 - dihydro - 18-homo-17α-propynylestradiol 3 methyl ether (1.5 g.) in dioxan (20 cc.) with stirring to methanol (50 cc.) containing oxalic acid dihydrate (1 g.) and water (10 cc.). Stir the mixture for 20 minutes after a clear solution is obtained and add water slowly until a crystalline precipitate is obtained. Filter off the crystals, wash with water, and dry to give 18-homo-17β-hydroxy-17α-propynylestr-5(10)-en-3-one (1.3 g.) M.P. 157–159°.

EXAMPLE 20

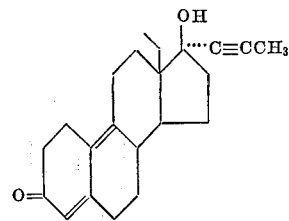

18-homo-17β-hydroxy-17α-propynylestra-4,9-dien-3-one

Add pyridine hydrobromide perbromide (1.4 g.) with stirring under nitrogen to 18-homo-17β-hydroxy-17α-propynylestr-5(10)-en-3-one (1.5 g.) in pyridine (50 cc.). Stir the mixture for 10 minutes at room temperature and then for 20 minutes on the steam bath. Work up as in Example 1 to obtain a product which, when recrystallised from ethyl acetate-hexane, gives 18-homo-17β-hydroxy-17α-propynylestra-4,9-dien-3-one (.75 g.); M.P. 160–163°; light absorption 306–307 (196,000); infrared absorption 3400, 1600, 1630.

EXAMPLE 21

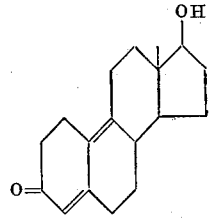

17aβ-hydroxy-D-homoestra-4,9-dien-3-one

Add D-homo-17aβ-hydroxyestr-5(10)-en-3-one (2.16 g.) with stirring in pyridine (7.5 cc.) to pyridine hydrobromide perbromide (2.4 g.) in pyridine (22.5 cc.) under nitrogen. Stir the mixture for 30 minutes at room temperature and 100° for 30 minutes. Add the cooled mixture to crush ice and acidify with 2 N hydrochloric acid. Extract the product with ether-benzene and evaporate the washed and dried extracts to give a residue which is recrystallised from ethyl acetate to give 17aβ-hydroxy-D - homoestra - 4,9 - dien - 3 - one; light absorption 305 (20,000); infrared absorption 3400, 1645, 1600, 1580.

EXAMPLE 22

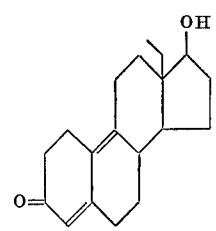

17aβ-hydroxy-D,18-bishomoestra-4,9-dien-3-one

Substitute an equivalent amount of D,18-bishomo-17aβ-hydroxyestr-5(10)-en-3-one for D-homo-17aβ-hydroxyestr-5(10)-en-3-one in the previous example to afford 17aβ-hydroxy-D,18-bishomoestra-4,9-dien-3-one; one absorption 305 (20,000); infrared absorption 3400, 1645, 1600, 1580.

EXAMPLE 23

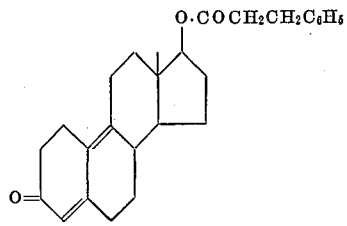

17aβ-3'-phenylpropionyloxy-D-homoestra-4,9-dien-3-one

Add 3-phenylpropionyl chloride (1 g.) in benzene (3 cc.) to D-homo-17aβ-hydroxyestr-5(10)-en-3-one (1 g.) in pyridine (3.5 cc.) at −20°. Leave the mixture overnight at −10°, pour on to crushed ice and extract with ether-benzene. Wash the extracts in turn with 2 N aqueous potassium hydroxide, water, 2 N hydrochloric acid, and brine; dry and evaporate to dryness. Dissolve the residue in benzene and chromatograph on silica gel to yield 17aβ-3'-phenylpropionyloxy-D-homo-estra-4,9-dien-3-one; light absorption 305 (20,000); infrared absorption 1745, 1670, 1620.

EXAMPLE 24

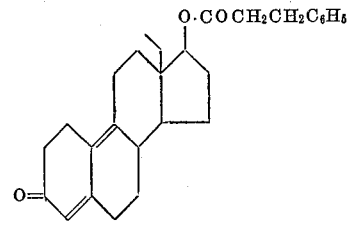

17aβ-3'-phenylpropionyloxy-D,18-bishomoestra-4,9-dien-3-one

Substitute D,18-bishomo-17aβ-hydroxyestr-5(10)-en-3-one for D-homo-17aβ-hydroxyestr-5(10)-en-3-one in the preceding example to afford 17aβ-3'-phenylpropionyloxy-D,18-bishomoestra-4,9-dien-3-one; light absorption 305 (20,000); infrared absorption 1745, 1670, 1620.

EXAMPLE 25

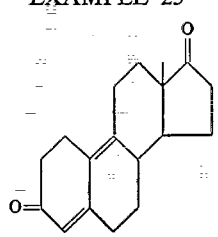

D-homoestra-4,9-dien-3,17a-dione

Treat D-homo-17aβ-hydroxyestr-5(10)-en-3-one (.8 g.) in acetone (50 cc.) containing anhydrous magnesium sulphate (1 g.) with 8 N chromic acid (1 cc.). Stir the mixture at room temperature for 3 minutes and then add isopropyl alcohol (1 cc.) followed by sodium bicarbonate (1 g.). Filter the mixture and evaporate the filtrate to give a residue which, when recrystallised from ether-hexane, gives D-homoestra-4,9-dien-3,17a-dione; light absorption 305 (20,000); infra-red absorption 3400, 1710, 1645, 1600.

EXAMPLE 26

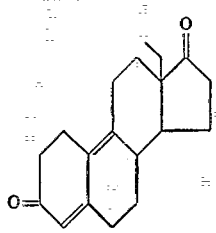

D,18-bishomoestra-4,9-dien-3,17a-dione

Substitute D,18-bishomo-17aβ-hydroxyestr-5(10)-en-3-one for D-homo-17aβ-hydroxyestr-5(10)-en-3-one in the preceding example to afford D,18-bishomoestra-4,9-dien-3,17a-dione; light absorption 305 (20,000); infrared absorption 3400, 1710, 1645, 1600.

EXAMPLE 27

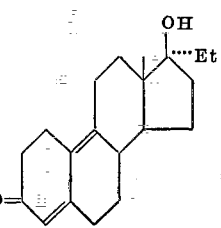

17aα-ethyl-D-homo-17aβ-hydroxyestra-4,9-dien-3-one

Add 17aα-ethyl-D-homo-17aβ-hydroxyestr-5(10)-en-3-one (2 g.) in pyridine (15 cc.) with stirring to pyridine hydrobromide perbromide (2.03 g.) in pyridine (15 cc.) under nitrogen. Carry out the reaction and work up the product as in Example 1 to give (from benzene-ether) 17aα - ethyl - D-homo-17aβ-hydroxyestra-4,9-dien-3-one; light absorption 305 (20,000); infrared absorption 3400, 1645, 1605, 1575.

EXAMPLE 28

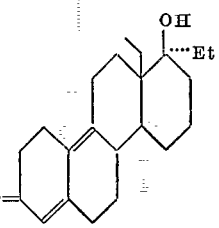

17a,α-ethyl-D,18-bishomo-17a,β-hydroxyestra-4,9-dien-3-one

Substitute an equivalent amount of 17a,α-ethyl-D,18-bishomo-17a,β-hydroxyestr-5(10)-ene-3-one for 17a,α-ethyl - D - homo-17a,β-hydroxyestr-5(10)-en-3-one in the preceding example to afford 17a,α-ethyl-D,18-bishomo-17a,β-hydroxyestra-4,9-diene-3-one; light absorption 305 (20,000); infrared absorption 3400, 1645, 1605, 1575.

EXAMPLE 29

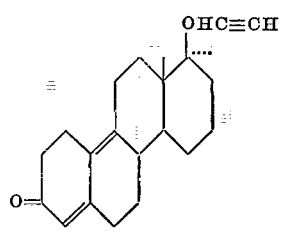

17a,α-ethynyl-D-homo-17a,β-hydroxyestra-4,9-dien-3-one

Add 17a,α - ethynyl-D-homo-17a,β-hydroxyestr-5(10)-en-3-one (0.68 g.) in pyridine (5 cc.) with stirring to pyridine hydrobromide perbromide (0.7 g.) in pyridine 7.5 cc. under nitrogen Carry out the reaction and work up the product as in Example 1 to give 17a,α-ethynyl-D-homo-17a,β-hydroxyestra-4,9-dien-3-one; light absorption 306 (20,000); infrared absorption 3310, 3220, 2100, 1635, 1600.

EXAMPLE 30

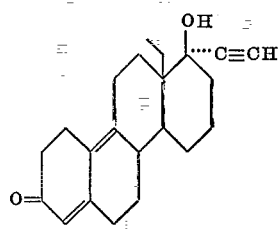

17a,α-ethynyl-D,18-bishomo-17a,β-hydroxyestra-4,9-dien-3-one

Substitute an equivalent amount of 17a,α-ethynyl-D,18-bishomo-17a,β-hydroxyestr-5(10)-en-3-one for 17a,α-ethynyl-D-homo-17a,β-hydroxyestr-5(10)-en-3-one in the preceding example to afford 17a,α-ethynyl-D,18-homo-17a,β-hydroxyestra-4,9-dien-3-one; light absorption 306 (20,000); infrared absorption 3310, 3220, 2100, 1635, 1600.

EXAMPLE 31

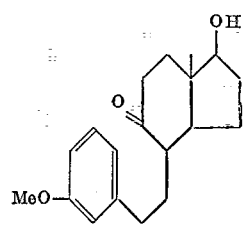

Hexahydro-4-(2'-m-methoxyphenyl)-8-methyl-indan-1-ol-5-one

Hydrogenate 5,6,7,8 - tetrahydro-4(2'-m-methoxyphenylethyl)-8-methylindan-1-ol-5-one (2 g.) in ethanol (15 cc.) in the presence of 10% palladium on charcoal (500 mg.). After 12 hours, when the theoretical amount of hydrogen is absorbed, filter off the catalyst. Remove the solvent to give a colourless gum (1.9 g.); ultraviolet absorption shows maxima at 273 (2,000) and 280 mμ (1,900).

Treat the gum (0.35 g.) in pyridine (5 cc.) with benzoyl chloride (0.3 cc.) and allow the mixture to stand at room temperature for 4 hours. Add ether (50 cc.) and wash the solution with N hydrochloric acid, sodium bicarbonate solution, saturated brine, and filter through magnesium sulphate. Remove the solvents to leave a gum (0.6 g.) which is chromatographed on neutral alumina (20 g.). Elute with benzene-petrol (4:1) to give a colourless gum (0.42 g.) which partially crystallises after keeping for 3 months at a low temperature. Induce crystallization throughout the gum by rubbing with methanol-ether and filter off the product (195 mg., 41%); M.P. 94–98°. (Found: C, 76.6; H, 7.3. $C_{26}H_{30}O_4$ requires: C, 76.8; H, 7.4%.)

Hydrolysis of the crystalline benzoate with refluxing alcoholic potassium hydroxide solution gives hexahydro-4(2'-m-methoxyphenylethyl) - 8 - methylindan-1-ol-5-one in quantitative yield as colourless needles, M.P. 98–99° (from ether-methanol). (Found: C, 75.7; H, 8.75. $C_{19}H_{24}O_3$ requires: C, 75.5; H, 87%.)

EXAMPLE 32

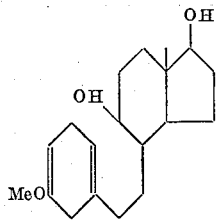

3-methoxy-9,10-secoestra-2,5(10)-dien-9,17-diol

Add sodium borohydride (0.15 g.) in ethanol (15 cc.) to hexahydro-4(2' - m - methoxyphenylethyl)-8-methyl-indan-1-ol-5-one (1.85 g.) in ethanol (30 cc.) and leave the mixture at room temperature for 1 hour. Decompose the excess borohydride with acetic acid and evaporate the solution to dryness. Wash the residue, extracted into ether, with saturated sodium bicarbonate solution, saturated brine, and filter through magnesium sulphate. Remove the solvent to leave a colourless gum (1.84 g.); infrared absorption 3415, 1610, 1598. This product (1.84 g.) in tetrahydrofuran (30 cc.) is added to a stirred solution of lithium (0.5 g., 10 g. atoms) in liquid ammonia (100 cc.). Continue stirring for a further 20 minutes before adding ethanol (10 cc.). After the blue colour has been discharged allow most of the ammonia to evaporate and add water (30 cc.) and ether (100 cc.) to the residue. Wash the organic phase with saturated brine, dry over magnesium sulphate and remove the solvent to leave 3-methoxy-9,10-secoestra-2,5(10)-dien-9,17-diol as a colourless gum (1.84 g.); infrared absorption 3420, 1689 and 1661. A product having an identical infrared spectrum is obtained by the direct reduction of hexahydro-4(2'-methoxyphenylethyl) - 8 - methylindan-ol-5-one with lithium and ethanol in liquid ammonia.

EXAMPLE 33

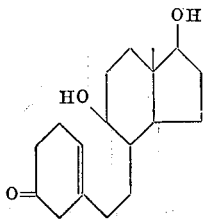

9,1-secoestr-5(10)-en-9,17-diol-3-one

Keep 3-methoxy-9,10-secoestra-2,5(10)-dien-9,17-diol 1.84 g.) for 1 hour in ethanol (180 cc.) containing oxalic acid dehydrate (2.8 g.) and water (36 cc.). Add water, extract the product with ether, and evaporate the washed and dried extracts to give 9,10-secoestr-5(10)-en-9,17-diol-3-one as a gum; infrared absorption 3400, 1705.

EXAMPLE 34

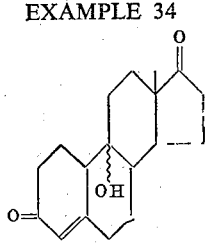

9-hydroxyestra-4-en-3,17-dione

Add 8 N chromic acid dropwise to 9,10-secoestr-5(10)-en-9,17-diol-3-one (0.99 g.) in acetone (100 cc.) until the solution has acquired a permanent yellow colour. Leave the mixture and then add ethanol (5 cc.). Evaporate the solution to a small volume and add water (100 cc.), and extract the product with ether. Wash the ethereal extracts with sodium bicarbonate solution and dry. Remove the solvent to leave a yellow gum (0.9 g.); infrared absorption 1735 (shoulder), 1705, 1660 (shoulder, weak). Distill this gum several times and submit for analysis. (Found: C, 75.1; H, 8.95. $C_{18}H_{24}O_3$ requires: C, 74.97; H, 8.4%). Chromatograph this product on activated Fuller's earth (Florex) (40 g.). Elute with benzene-chloroform (4:1) to give a pale yellow gum (0.53 g.) which crystallises on rubbing with ether. Recrystallise from benzene-ethyl acetate to give 9-hydroxyestra-4-en-3,17-dione (205 mg.), M.P. 175–194°. Several recrystallizations from benzene raise this melting point to 193–198°; infrared absorption 3400, 1734, 1677, 1615; light absorption 242 mμ (23,900). (Found: C, 75.6; H, 8.4. $C_{18}H_{24}O_3$ requires: C, 75.0; H, 8.9%).

EXAMPLE 35

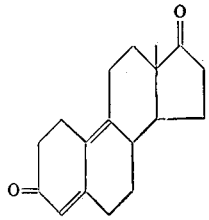

Estra-4,9-dien-3,17-dione

Treat 9-hydroxyestra-4-en-3,17-dione (78 mg.) in pyridine (1 cc.) with 1 cc. of a solution of thionyl chloride (0.5 cc.) in pyridine (10 cc.) and allow the mixture to stand at room temperature for 10 minutes. Pour the product on to ice, extract with ether, and wash the ethereal extracts with dilute sulphuric acid, sodium bicarbonate solution, and dry. Evaporate the solvents to leave a brown gum (60 mg.); light absorption 302 mμ (10,800) and chromatograph on Florex (10 g.). Elute with benzene-ether (1:1) to give estra-4,9-dien-3,17-dione (34 mg.); light absorption 301 (15,000).

EXAMPLE 36

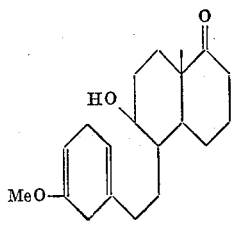

3-methoxy-9,10-seco-D-homoestra-2,5(10)-dien-9,17a-diol

Add 5-(2'-m-methoxyphenylethyl - 9 - methyl - 6 - oxo-5(10)-octalin-1-ol (4.55 g.) in tetrahydrofuran (50 cc.) to a solution of lithium (300 mg.) in liquid ammonia (350 cc.). Add a further 300 mg. of lithium (total-6 g. atoms) and stir the mixture for 10 minutes. Discharge the blue colour by the addition of solid ammonium chloride, isolate the product as a partially crystalline gum (quantitative yield). Do not purify this gum but dissolve it in tetrahydrofuran(100 cc.) and add to a stirred solution of lithium (1.2 g., 14 g. atoms) in liquid ammonia (500 cc.). After stirring for 15 minutes discharge the blue colour with ethanol (10 cc.) and obtain the product as before as a colourless gum. This gum is readily crystallised on rubbing with ether to give 3-methoxy-9,10-seco-D-homoestra-2,5(10)-dien-9,17a-diol as colourless needles, (3.1 g., 70%); M.P. 106–111°; infrared absorption 3350, 1695, 1665, 1220, 1147, 1038, 1018 and 786.

EXAMPLE 37

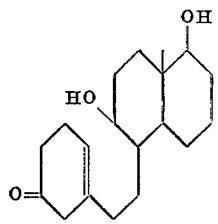

9,17a-dihydroxy-9,10-seco-D-homestr-5(10)-en-3-one
(CV)

Add 3-methoxy-9,10-seco-D-homoestra-2,5(10)-dien-9,17a-diol (5 g.) to methanol (100 cc.) containing glacial acetic acid (8.8 cc.) and reflux the mixture for 5 minutes (or allow to stand overnight at room temperature). Add water (800 cc.) to the cooled solution and wash the product, extracted into ether (4×100 cc.), with water (2×200 cc.), saturated brine, and dry over magnesium sulfate. Evaporate the solvent to leave a residue which, when recrystallised from ether, gives 9,17a-dihydroxy-9,10-seco-D-homestr-5(10)-en-3-one (3.74 g.) M.P. 67–70° (the cooled and resolidified material have M.P. 124–133°); infrared absorption 3400, 1700.

EXAMPLE 38

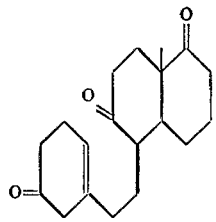

9,10-seco-D-homoestra-5(10)-en-3,9,17a-trione

Oxidise 9,17a-dihydroxy-9,10-seco-D-homoestra-5(10)-en-3-one (0.67 g.), in acetone (80 cc.), with chromic acid by the method of Example 7, described to give a pale yellow gum (0.56 g., 80%) which crystallises slowly on keeping at 0° for several days. Recrystallise from petrol containing a trace of ethyl acetate to give colourless needles, M.P. 64–69°. Recrystallise once more, followed by short path distillation to give pure 9,10-seco-D-homoestra-5(10)-en-3,9,17a-trione; M.P. 68–71°; infrared absorption (CS₂): 1715. (Found: C, 75.5; H, 8.7. $C_{19}H_{30}O_3$ requires: C, 75.5; H, 8.7%).

EXAMPLE 39

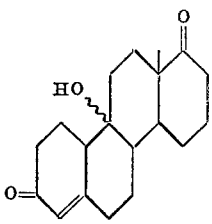

9-hydroxy-D-homoestra-4-en-3,17a-dione

Chromatograph the crude oxidation product from the previous Example 38 on Florex (20 g.).

Elute with benzene and with benzene-ether to give a highly crystalline compound (220 mg., 40%); M.P. 205–208°. Recrystallise from chloroform-benzene to give 9-hydroxy-D-homoestra-4-en-3,17a-dione; M.P. 205.5–207.5°; infrared absorption 3390, 1700, 1685, 1628, 1260, 1209, 1186, 1104, 1071, 925 and 871; light absorption 243 (10,500). (Found: C, 75.65; H, 8.7. $C_{19}H_{26}O_3$ requires: C, 75.5; H, 8.7%.)

EXAMPLE 40

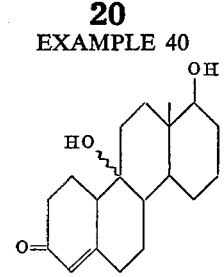

9,17a-dihydroxy-D-homoestra-4-en-3-one

Cool 9-hydroxy - D - homoestra-4-en-3,17a-dione (100 mg.) in absolute ethanol (10 cc.) to 8° and reduce with sodium borohydride (10 gm.) in ethanol (2 cc.) Recrystallise from chloroform-benzene to give 9,17a-dihydroxy-D-homoestra-4-en-3-one (56 mg.), M.P. 200–204; infrared absorption 3390, 1684, 1627, 1269, 1208, 1179, 1106, 1072, 925 and 871; light absorption 243 (12,200). (Found: C, 75.3; H, 8.9. $C_{19}H_{28}O_3$ requires: C, 75.0; H, 9.3%.)

EXAMPLE 41

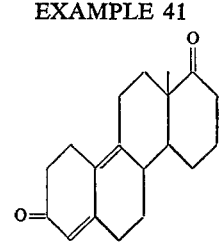

D-homoestra-4,9-dien-3,17a-dione

Add a very small crystal of iodine to 9-hydroxy-D-homoestra-4-en-3,17-dione (0.42 g.) in benzene (70 cc.), and reflux the mixture for 30 minutes. Remove the solvents almost completely under reduced pressure to leave a yellow gum which readily crystallises. Recrystallize from methanol to give D-homoestra - 4,9 - dien-3,17a-dione as clusters of pale yellow crystals (270 mg., 68%), M.P. 150–160°. Sublime this material and recrystallise from methanol to give the analytical sample, M.P. 165.5–167°; infrared absorption 1715, 1672; light absorption 302 (16,700). (Found: C, 80.05; H, 8.55. $C_{19}H_{24}O_2$ requires: C, 80.2; H, 8.5%.)

EXAMPLE 42

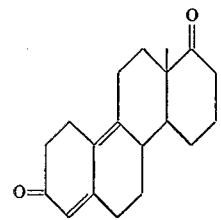

D-homoestra-49-dien-3,17a-dione

Add 9-hydroxy - D - homoestra-4-en-3,17-dione (250 mg.) in benzene (20 cc.) to p-toluene sulphonic acid (120 mg.) in acetic acid (2 cc.) and reflux the mixture for 2 hours. After cooling, add ether (50 cc.) and wash the solution with sodium bicarbonate solution, saturated brine, and dry. Remove the solvent and recrystallize the product from petrol-ether to give D-homoestra-4,9-dien-3,17a-dione (120 mg.); M.P. 164–166°.

EXAMPLE 43

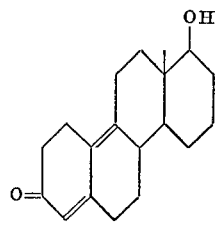

17a-hydroxy-D-homoestra-4,9-dien-3-one

Cool D-homoestra-4,9-dien-3,17a-dione (230 mg.) in ethanol (25 cc.) to 8° and reduce with sodium borohydride (20 mg.).

Recrystallise the product from ether-petrol-benzene (trace) to give 17a-hydroxy-D-homoestra-4,9(10)-dien-3-one (157 mg., 68%), M.P. 137–139.5°.

EXAMPLE 44

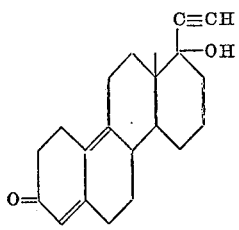

17a-β-hydroxy-17a-α-ethynyl-D-homoestra-4,9-dien-3-one

Pass a slow stream of acetylene through liquid ammonia (100 cc.) in a flask which is cooled in a bath containing solid carbon dioxide and acetone and introduce potassium (7.6 g.) in portions. Increase the stream of acetylene and when the blue colour is discharged, add a solution of D-homoestra-4,9-dien-3,17-dione (14 g.) in benzene (100 cc.) and ether (100 cc.). Pass acetylene for 3 hours, then allow the reaction mixture to warm up to 10° and stand for 18 hours. Add water and extract the mixture with ether. Wash the organic solution with water until neutral, dry and evaporate. Recrystallise the residue from methanol to give 17a-β-hydroxy-17a-α-ethynyl-D-homo-estra-4,9-dien-3-one.

U.V. $\lambda_{max}$ 306 m$\mu$ (19,000)
I.R. 3380, 3200, 1640, 1600 cm.$^{-1}$

EXAMPLE 45

17α-vinyl-18-homo-17β-hydroxyestra-4,9-dien-3-one

17α-ethinyl-1,4-dihydro-18-homoestradiol-3-methyl ether (1 g.) in pyridine (20 cc.) is shaken with palladium on calcium carbonate catalyst (0.05 g.) in an atmosphere of hydrogen according ot the procedure of Sandoval et al., J. Am. Chem. Soc., 77, 150 (1955). When 1 mole of hydrogen has been absorbed the mixture is filtered and the filtrate evaporated to dryness in vacuo. The residue in methanol (100 cc.) is heated with a solution of oxalic acid dihydrate (1 g.) in water (10 cc.) and the mixture allowed to stand at room temperature for 45 minutes. The solution is diluted with ether (300 cc.), washed with water, saturated aqueous sodium bicarbonate solution, water and dried. The solvent is evaporated and the residue crystallized from methanol to give 17α-vinyl-18-homo-19-nor-17β-hydroxyestr-5(10)-en-3-one. This product (0.5 g.) in pyridine (12 cc.) is cooled to 0° and the solution treated with pyridine perbromide hydrobromide (1.1 g.) and stirred for 1 hour at room temperature and then refluxed for a further hour. The cooled solution is diluted with water and extracted with ether. The ethereal solution is washed, dried and evaporated and the residue dissolved in acetone (30 cc.) containing sodium iodide (3 g.) and the mixture refluxed for 5 hours. The cooled solution is diluted with ether (100 cc.), washed with water, dried and the solvent removed in vacuo. The residue is absorbed on neutral alumina (40 g.) and eluted with benzene. Elution with benzene-ether mixtures gives after evaporation of the solvent and crystallization from methanol 17α-vinyl-18-homo-17β-hydroxyestra-4,9-dien-3-one.

U.V. $\lambda_{max}$ 306 m$\mu$ (18,000)
IR 1645, 1605 cm.$^{-1}$

EXAMPLE 46

17,17-ethylenedioxy-18-homoestra-4,9-dien-3-one 1,4-dihydro-17,17-ethylenedioxy-18-homoestrone methyl ether (0.4 g.) is stirred with methanol (30 cc.) and oxalic acid (0.46 g.) in water (6 cc.) for 1 hour at room temperature. Ether (100 cc.) is added and the mixture washed with aqueous sodium bicarbonate, water and dried. The solvent is evaporated and the product crystallized from ethanol. This 17,17-ethylenedioxy-18-homoestr-5(10)-en-3-one (0.5 g.) is dissolved in pyridine (10 cc.) and pyridine perbromide hydrobromide (0.5 g.) added. The mixture is stirred at room temperature in an atmosphere of nitrogen for 30 minutes and then at 100° for 30 minutes. The cooled reaction mixture is diluted with water (50 cc.) and extracted with ether. The ethereal solution is washed with ice cold N-hydrochloric acid (3×30 cc.), sodium bicarbonate solution, washed and dried. The solvent is removed under reduced pressure and the residue filtered through 'Florisil' with ether-benzene. Removal of the solvent gives 17,17-ethylenedioxy-18-homoestra-4,9-dien-3-one.

IR 1648 cm.$^{-1}$
U.V. $\lambda_{max}$. 305 m$\mu$ ($\epsilon$19,000)

EXAMPLE 47

18,19-bisnor-17β-hydroxy-13β-n-propyl-17α-propynylestra-4,9-dien-3-one

Added 18,19-bisnor-17β-hydroxy-13β-n-propyl-17α-propynylestr-5(10)-en-3-one (1.8 g.) in pyridine (7.5 cc.) to pyridine hydrobromide perbromide (1.73 g.) in pyridine (20 cc.). Stir the mixture under nitrogen for 30 minutes at room temperature and then heat at 100° for a further 30 minutes. Work up as described in Example 1, and purify the product by chromatography on silica gel and recrystallisation from ether-hexane to obtain 18,19-bisnor-17β-hydroxy-13β-n-propyl-17α-propynyl-estra-4,9-dien-3-one (1 g.) M.P. 164–166°.

U.V. 306 (20,700)

We claim:

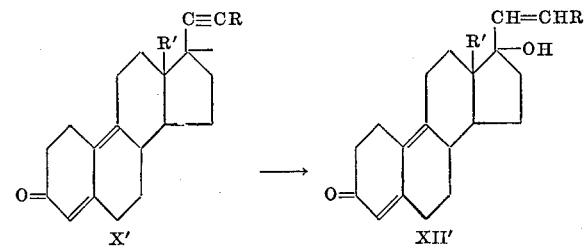

1. 9-hydroxygon-4-en-3-one having attached thereto in the 13-positon a lower alkyl radical, and in the 17-position a keto group.

2. A process for preparing a gona-4,9-dien-3-one having attached thereto in the 13-position a polycarbon lower alkyl radical comprising brominating with pyridine hydrobromide perbromide in the presence of pyridine at room temperature a gon-5(10-en-3-one having attached thereto in the 13-position a polycarbon lower alkyl radical and dehydrobrominating at an elevated temperature the addition product resulting therefrom.

3. A process for preparing a 13-lower alkyl-gona-4,9-dien-3-one (having attached thereto in the 13-position a lower alkyl radical) comprising dehydrating in a solvent under mild acid or basic conditions a 13-lower alkyl-9-hydroxygon-4-en-3-one (having attached thereto in the 13-position a lower alkyl radical).

4. A process for preparing a 13-lower alkyl-9-hydroxygon-4-en-3-one (having attached thereto in the 13-position a lower alkyl radical) comprising cyclizing a 13-lower alkyl-9,10-secogon-5(10)-en-3,9-dione (having attached thereto in the 13-position a lower alkyl radical under) by means of an aldol condensation under acid or basic conditions.

5. A process for preparing a 13-lower alkyl-gona-4,9-dien-3-one (having attached thereto in the 13-position a lower alkyl radical) comprising cyclizing a 13-lower alkyl-9,10-secogon-5(10)-en-3,9-dione (having attached thereto in the 13-position a lower alkyl radical under) by means of an aldol condensation under acid or basic conditions and dehydrating in a solvent under mild acid or basic conditions the product derived therefrom.

References Cited
UNITED STATES PATENTS 3,069,421  12/1962  Nomine et al. ---- 260—239.55

HENRY A. FRENCH, Primary Examiner

U.S. Cl. X.R.

260—239.55, 397.3, 397.4, 340.9, 469, 488, 586, 590, 611, 999